Oct. 21, 1952         G. B. R. FEILDEN         2,614,385
SUPPORTING STRUCTURE FOR GAS TURBINE POWER PLANTS
Original Filed Jan. 14, 1946         7 Sheets-Sheet 1
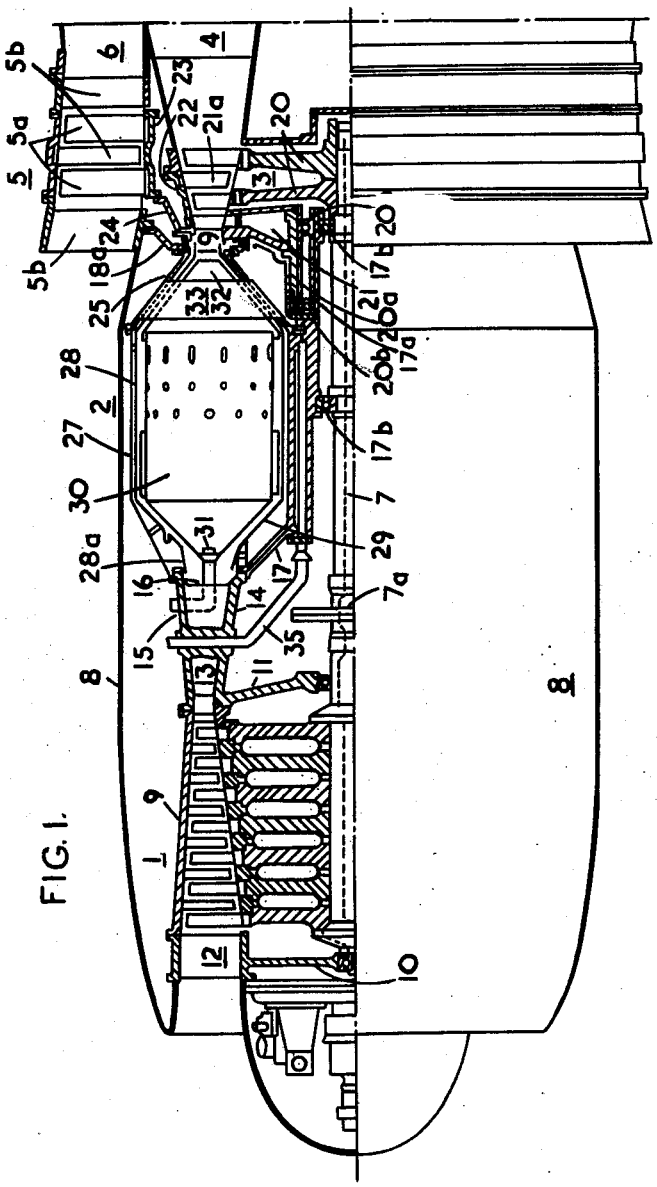
Geoffrey B. R. Feilden
Inventor
By
Roberts B Larson
Attorney Oct. 21, 1952 G. B. R. FEILDEN 2,614,385
SUPPORTING STRUCTURE FOR GAS TURBINE POWER PLANTS
Original Filed Jan. 14, 1946 7 Sheets-Sheet 2
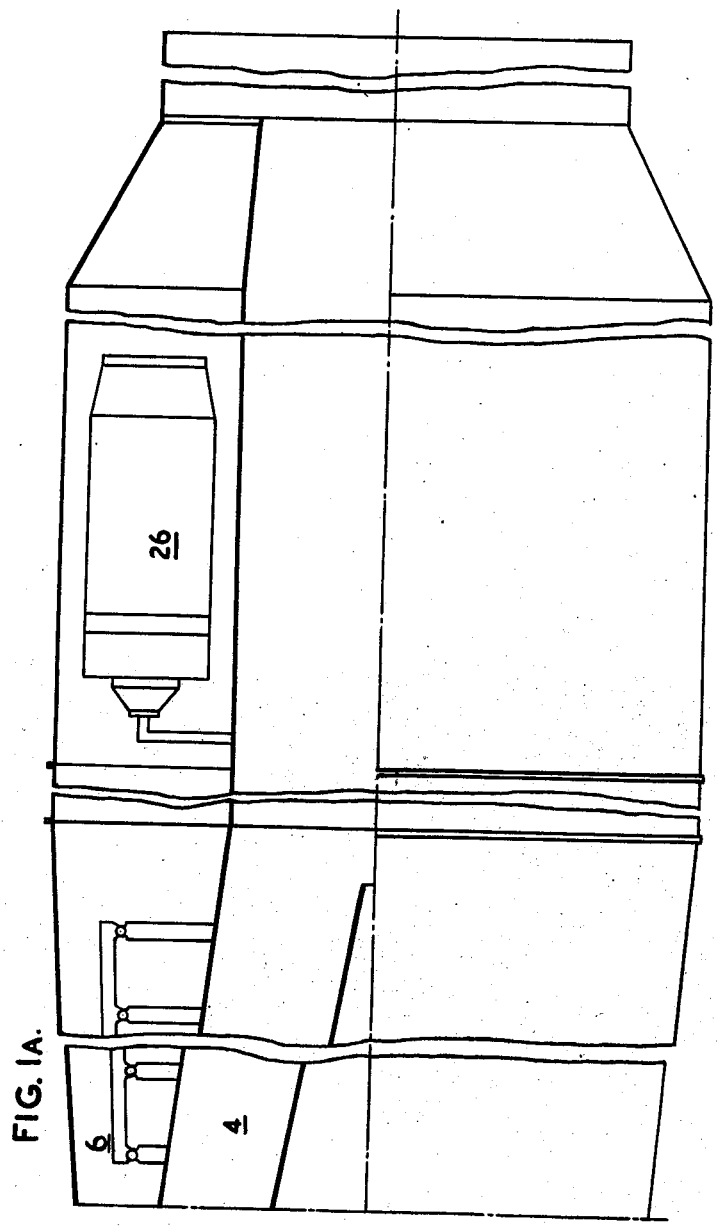
Geoffrey B. R. Feilden
Inventor
By Roberts B Larson
Attorney GEOFFREY B. R. FEILDEN
Inventor By Roberts B Larson
Attorney Oct. 21, 1952         G. B. R. FEILDEN         2,614,385
SUPPORTING STRUCTURE FOR GAS TURBINE POWER PLANTS
Original Filed Jan. 14, 1946         7 Sheets-Sheet 4

GEOFFREY B. R. FEILDEN
Inventor
By
Roberts B Larson
Attorney

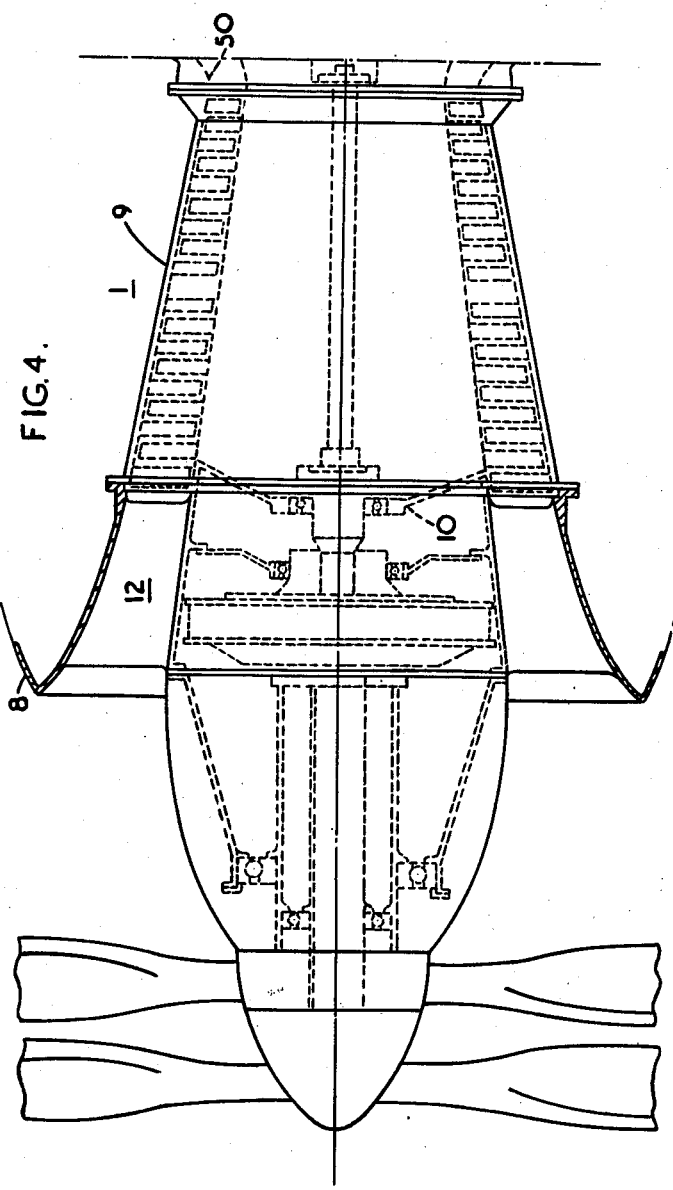

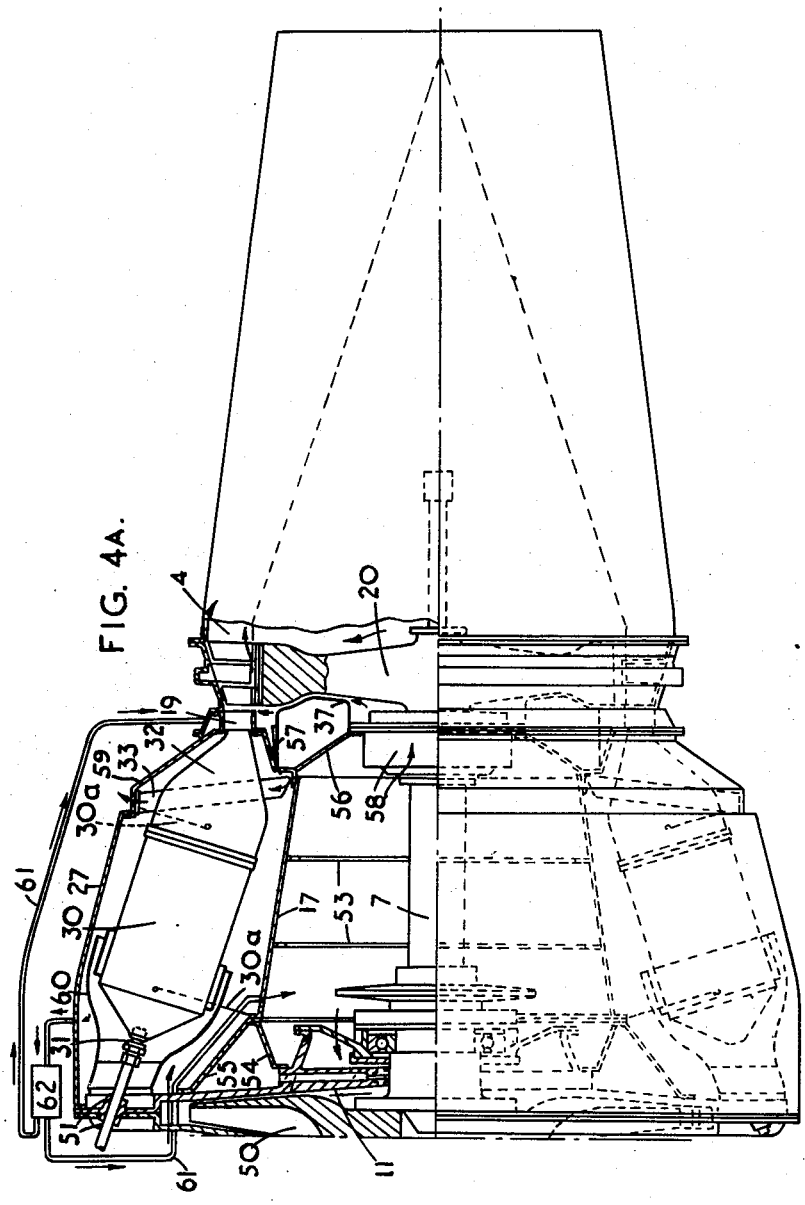

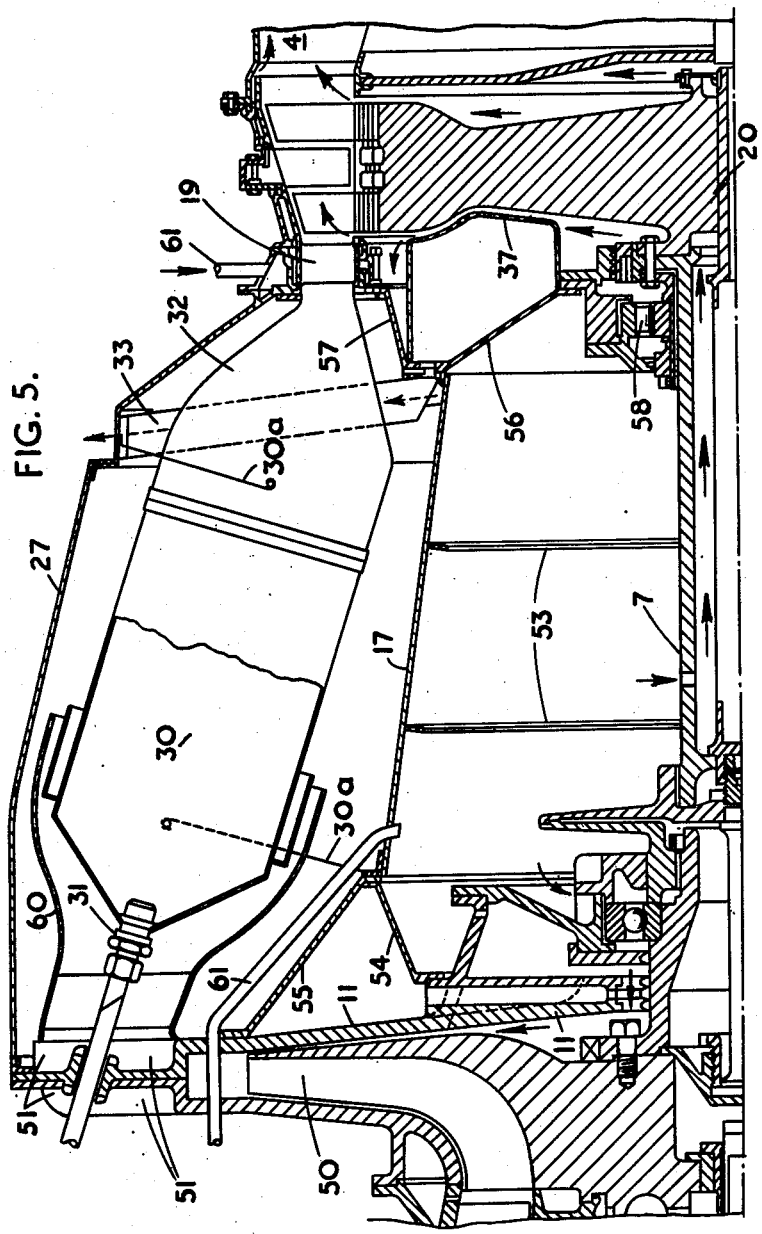

Patented Oct. 21, 1952

2,614,385

UNITED STATES PATENT OFFICE 2,614,385

SUPPORTING STRUCTURE FOR GAS TURBINE POWER PLANTS

Geoffrey B. R. Feilden, Canwick, Lincoln, England, assignor to Power Jets (Research and Development) Limited, London, England, a company of Great Britain Original application January 14, 1946, Serial No. 641,144. Divided and this application August 30, 1949, Serial No. 113,117. In Great Britain January 16, 1945

1 Claim. (Cl. 60—39.37)

This invention relates to gas turbine power plant of the kind comprising a coaxial compressor and turbine axially spaced in tandem and connected by shafting to form a single rotary unit driven by the turbine and accommodating in the space between them a combustion system through which working fluid is supplied by the compressor to the turbine with the general direction of flow in an axial direction. Where such a machine is to be used as a power unit, for example for the propulsion of aircraft, various attributes are desirable. For example the unit should be kept as compact and as light as possible, while maintenance and replacement of components and probably periodical inspection of internal components should be facilitated. It is also desirable that the disposition of parts which are liable to fluctuations of temperature or which operate with a temperature gradient through them should be such as to allow for or cope with relative expansions and contractions, and distortions, without adverse effect. The various aspects of the present invention seek to provide such attributes as well as others. Particular objects of the invention as applied to a gas turbine power unit for aircraft are to achieve a symmetrical construction capable of withstanding the requisite loads, affording good combustion properties without undue pressure loss and affording accessibility for replacement or inspection. A more specific object in a particular example is to provide a combustion arrangement which is conveniently disposed in relation to a complete power unit.

The invention is based on the conception of using, in a gas turbine power unit of the kind referred to, a combustion system comprising an annular aircasing providing a flow path from compressor to turbine which encloses the driving shaft, and combustion chamber means in which the actual combustion takes place arranged within and annularly distributed around said aircasing.

In association with this conception, in accordance with the invention the inner wall of said annular aircasing is formed as a stiff member which is structurally integrated with the stationary structure at adjacent sides of the compressor and turbine to form therewith a substantially rigid unit and performs the dual function of defining the boundary of the fluid channel enclosing the driving shaft and forming a rigid backbone structure serving as a major stress carrying element of the stationary structure unifying the compressor and turbine sections of the unit.

According to a further feature of the invention, the outer wall of the annular aircasing is also of unitary circular structure attached to the compressor and turbine stationary structure and forming a supplementary stress-carrying element of the structure unifying the compressor and turbine sections of the unit.

In a preferred application, the various features of the invention are embodied, in a gas turbine power plant comprising a multistage compressor with air outlets arranged symmetrically about its shaft axis and directed in a general sense axially, and an axial flow turbine spaced axially from the compressor and in tandem therewith.

While the aircasing walls will normally be of circular cross section, and the space between them truly annular, the use of other equivalent sections would be within the spirit of the invention, and the expression "annular" is accordingly to be interpreted as including non-circular closed sections bounded by inner and outer spaced enclosing walls.

An example of application of the invention will now be described with reference to the accompanying drawings, which illustrate by way of example two aircraft gas turbine units embodying the invention, and in which:

Figures 1 and 1A constitute together an elevation in half longitudinal section showing the general arrangement of an aircraft jet propulsion gas turbine power unit embodying the invention in one constructional form;

Figure 2:
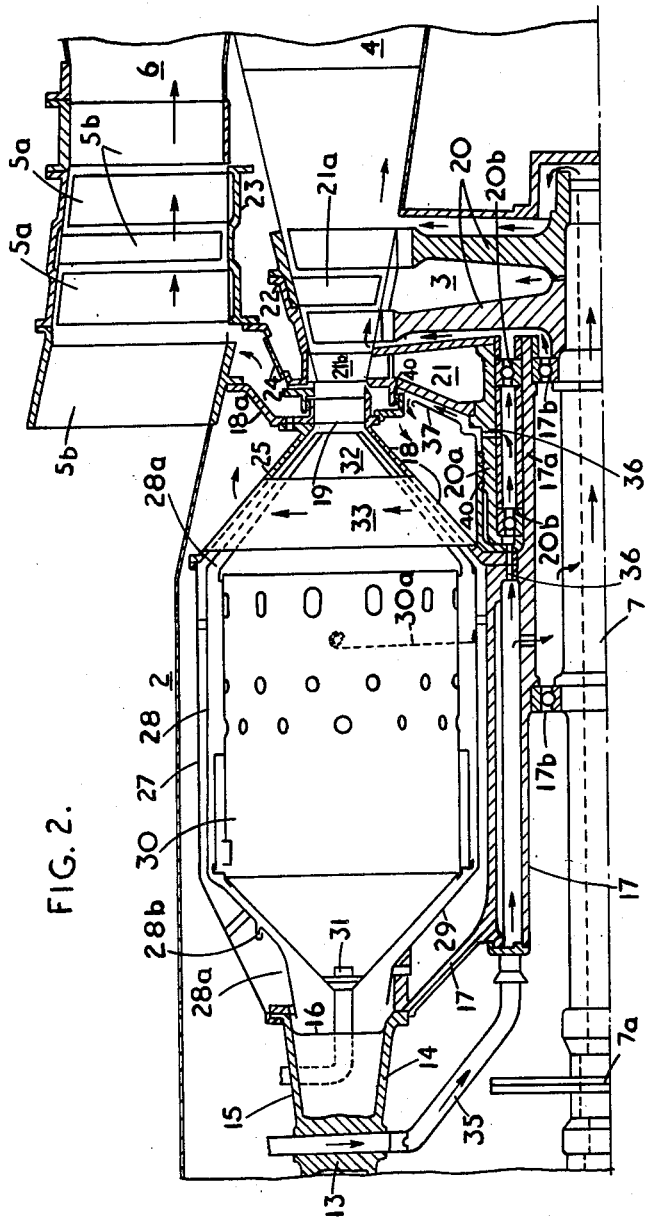
Figure 2 is a detail sectional elevation to an enlarged scale illustrating the construction of the aircasing of the power unit illustrated in Figure 1, and the construction and mounting of flame tube combustion elements and air jackets therein.

Figures 4 and 4A together constitute an elevation of another jet propulsion gas turbine power unit illustrating the general arrangement thereof in part longitudinal section in the region of the aircasing, which is of a modified form as compared with Figure 1;

Figure 5 is a detail sectional elevation to an enlarged scale illustrating the modified construction of aircasing and construction and mounting of flame tube combustion elements embodied in Figure 4A.

Certain features of the units illustrated also form the subject of co-pending application No. 641,144 filed January 14, 1946, of which this application is a division.

In the example illustrated in Figure 1, the power units comprises generally a multistage axial compressor 1, an annular combustion arrangement 2, a turbine 3 exhausing into a reaction jet passage 4, a thrust-augmenting ducted fan 5 associated with the turbine 3 and operating in a supplementary reaction jet passage 6 coaxially surrounding the passage 4, and a shaft 7 common to the compressor 1 and turbine 3 through which the latter drives the former, and with respect to which the entire engine is arranged in a symmetrical circular manner, the said shaft incorporating a flexible coupling 7a having resilient flange elements and a tension element which resists the opposed end thrusts developed by the compressor and turbine. The forward end of the unit when installed, is enclosed by a fairing 8 as may be appropriate to the aircraft concerned. At the forward end of the compressor is carried a gear box for driving accessories which derives its power from the shaft 7.

The compressor 1 has a rotor built up from a plurality of separate discs each carrying peripherally a row of compressor blading, while the stator blades extend inwardly from an outer casing 9 which, with the front and rear walls 10, 11, in which bearings are provided for the shaft 7, defines an annular inlet at 12 and outlet at 13, of which the latter is extended axially by inner and outer annular walls 14, 15 which, with radial walls 16 therebetween form a series of axially directed diffuser channels all opening at an annulus defined by two concentric flanges of the walls 14, 15. To the inner flange (see more particularly Figure 2) is attached a hollow member 17 of circular cross section which encloses the shaft 7 and extends coaxially therewith towards the turbine 3. Towards its rear end, the member 17 is rigidly attached to the apex of a frustoconical member 18 the rearward or base rim of which provides the inner support of the turbine entry nozzle annulus 19, between which and the inner wall of the passage 6 is a frusto-conical bracing annulus 18a.

In the construction illustrated, the turbine, generally indicated at 3, comprises a first or compressor-driving turbine having two axially spaced bladed rotors 20 fast on the shaft 7, and a second turbine having one bladed rotor 21 which is arranged forwardly of the rotors 20 and has a bearing sleeve 20a by which it is rotatably mounted through axially spaced bearings 20b on a tubular member forming in effect a rearward extension 17a of the member 17 already referred to, the said extension 17a and member 17 being in turn spaced from the shaft 7 and supporting it by axially spaced bearings 11b as indicated. The blading of the rotor 21 is connected to a peripheral rim 22 which extends rearwardly to form both a tip shroud for the blading of the rotors 20, and a support for a second ring of blades 21a of the second turbine, these blades extending radially inwardly, like interstage stator blading. There is no fixed nozzle ring or interstage stator blading associated with the first turbine, the function of such parts being performed by the first and second rows of blading of the second turbine, which accordingly rotates contrarily to the first. The function of the second turbine is to drive the two stage ducted fan 5 whose rotatable blades 5a are carried by a drum 23 whose forward end is supported on the rim 22 of the second turbine by a frusto-conical member 24, and whose stator blades 5b are fixed to the main structure of the ducting forming the passage 6, the inner wall of which is braced from the nozzle ring of the second turbine by the frustoconical member 18a. It follows from this construction that the torque of the second turbine is transmitted outwardly to the fan drum 23 so that the fan will augment the flow of air in the duct 6 derived from the forwardly facing entry. The ducts 4, 6 unite at some distance aft of the fan 5 and in the intervening length of the duct 6 fuel combustion means 26 are provided further to energise the airflow, preferably so as to accelerate it to the velocity of the turbine exhaust stream in the passage 4 before the two streams emerge as a single propulsive jet.

The hollow member 17 constitutes the inner air pressure-sustaining wall of an axially extending annular aircasing, the outer air pressure-sustaining wall of which is formed by a tubular member 27 detachably secured at its forward end to the outer flange of the compressor outlet annulus defined by the walls 14, 15 and at its rear end to a frustoconical member 25 whose apex is secured to the turbine nozzle ring 19. The member 27 is of such internal diameter that when its fastenings are released it may be slid forwardly over the compressor casing 9. The members 27, 17, have mounted thereon in spaced relationship, thereto, sheet metal liners 28, 29, to provide an air jacket for the inner and outer walls of the aircasing, these liners being arranged at their ends to pick up a proportion of the incoming air stream and discharge it to the turbine after flowing through the respective air jackets. In this connection, in order that it shall not interfere with the axial withdrawal of the outer wall 27, the liner 28 makes loose overlapping joints with liner parts 28a which are mounted on parts of the structure which remain fixed when the member 27 is removed.

Figure 3:
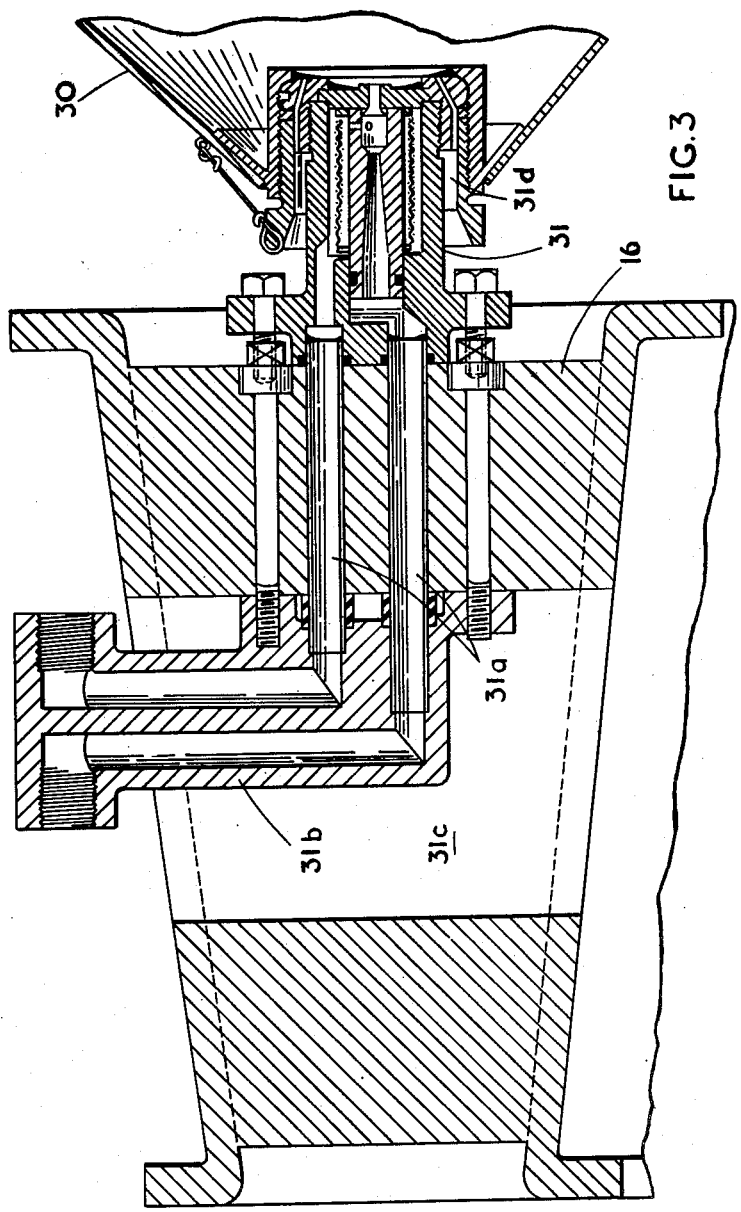
Figure 3 is a further enlarged detail illustrating the mounting of a flame tube combustion element on a burner.

Between the walls 17, 27, and in the annular cavity they enclose, is provided an annularly arranged series of axially extending flame tubes so dimensioned as to permit freedom of airflow around and among them. The main body 30 of each flame tube is cylindrical and has at its upstream end a frustro-conical closure whose apex engages axially with, and is supported by, the protruding end of a cylindrically shaped burner or fuel nozzle 31 which is coaxial with the flame tube and is mounted upon one of the diffuser walls 16 of the compressor outlet annulus. A suitable form of such a construction is illustrated in Figure 3, in which the burner body 31 is bolted to one of the diffuser walls 16 of the compressor outlet annulus in register with fuel supply connections 31a provided in the body of the wall 16 and registering also with a fuel pipe connection element 31b accommodated in a passage 31c extending radially through said wall, which incidentally also affords an air passage between the chamber enclosed by the inner side of said compressor annulus and the outside atmosphere. The flame tube is retained against involuntary displacement by making threaded engagement with the nozzle 31 as shown, or by other suitable means, and provision is made by a passage 31d for the entry of combustion air through and around the nozzle. The flame tube wall is also perforated and provided with appropriate guides and baffles as may be found necessary for combustion. The downstream end of the cylindrical body 30 of the tube is supported, for example by flexible tie members 30a connected to the liner 29, so as to lie just within and spaced from the circular upstream end of an outlet chute 32 which tapers in the downstream direction to a flattened section corresponding to a segment of the annular nozzle ring 19 of the turbine. This method of flame tube suspension is the subject of copending patent application No. 647,381 filed February 13, 1946, now Patent No. 2,511,432. Space is left around the outside of each outlet chute 32 for the passage of some air to the turbine nozzle so that this air cools the wall of the chute and, being itself heated in the process, ultimately joins the hot gases which are entering the turbine. The chute 32 is located and supported by a substantially radial strut-like element 33 passing therethrough and also through the liners 28a, 29, and inner and outer aircasing members 18, 25, to all of which parts the strut is secured, as by welding. Preferably the primary purpose of the struts 33, which are provided at intervals around the annulus of the aircasing, is to maintain the concentricity of the aircasing parts 18, 25, but they may also be made hollow and thus provide a communicating passage between the space enclosed by the member 18 and the outside of the aircasing permitting a flow of cooling air through the strut.

Alternative methods of supporting the outlet chute 32 may be adopted, but in any case the support is so contrived as to permit longitudinal and radial expansions without bodily displacement of the flame tube and without imposing specific stresses thereon or on any of the related parts.

To remove any flame tube body 30, the outer wall 27 of the aircasing is cast loose and displaced axially over the compressor casing 9, whereafter the threaded or other attachment of the flame tube body to the burner 31 is freed and the flame tube body shifted axially towards the turbine to free it completely from the burner (a movement which is allowed for in the spacing of the downstream end of the body 30 from any axially obstructing parts). The body 30 may then be tilted sufficiently to allow it to be withdrawn.

As an alternative the flame tube body 30 may be left attached to the burner, and the latter unbolted so that it can be withdrawn from its mounting by the axial movement of the flame tube. In either case, the burner itself is in essence the support of the flame tube at its upstream end, while the means which relate it to the outlet chute or to the main aircasing structure (which permit expansion) are the support at the other end.

In addition to forming the air pressure-sustaining walls of an annular aircasing, the outer of which, as to its greater part, is axially removable to expose the readily removable flame tubes, the members 17, 27, 18 and 25 together form a rigid backbone structure constituting a major stress-carrying element which with the flanges of the compressor outlet annulus and the turbine nozzle ring forms a rigid unit. By making the parts 17, 27, 18 and 25 serve this dual purpose an appreciable saving of weight can be achieved without sacrifice of rigidity and strength.

The use of an annular aircasing enclosing a space around the compressor-turbine shaft 7 bounded at its rearward end by the turbine rotor lends itself admirably to the provision of a distributing system for cooling air, additional to that already referred to in connection with the internal construction of the aircasing and flame tubes, which will assist in avoiding gas leakage, local distortions and excessive local temperatures, and to a considerable extent render uniform the temperature distribution throughout the engine. One such system is illustrated in Figures 1A and 2, in which the wall formed by the inner member 17 of the aircasing is made hollow and, being connected by a pipe 35 to a suitable point on the compressor to receive compressed air therefrom, distributes it as indicated by the arrows in Figure 2. The hollow wall of the member 17 forms air passages 36 (see Figure 2) which are connected to the turbine bearing housing and also to the chamber bounded by the member 18 and the face and journal sleeve of the turbine rotor 21 and with the space between the rotors 21, 20. Said chamber contains a stationary sheet metal liner 37 of annular form which constrains the air flow to follow the surface of the turbine rotor parts, the air eventually escaping through the flame tube struts 33 to the inlet of the augmenter duct. In addition, the shaft 7 is made hollow and transmits air to the inner and rear faces of the rotors 20, whence it escapes to the turbine gas stream. The air coming direct from the compressor is arranged to be at a slightly higher pressure than that in the turbine so that the tendency is for the air to flow into the turbine rather than for gas to escape from the latter.

By means of the air systems described above, or modifications thereof, the various cavities and regions of the engine may be supplied with compressed air in such a way as to effect cooling and oppose any tendency to gas leakage, although gas seals will still be employed where necessary.

In the construction of aircasing illustrated in Figures 1 and 2, the inner members 17, 18, and the outer member 25, are formed by relatively substantial castings; according to a further feature of the invention these parts are fabricated from sheet metal while still retaining the features that the aircasing, in addition to being the air pressure-sustaining element of the combustion arrangement, constitutes a major stress-carrying structure forming with the compressor and turbine casings a substantially rigid unit.

Such a modified form of aircasing is illustrated in Figures 4 and 4A in which parts similar to those in Figures 1 and 1A have like reference numerals, as applied to another form of power unit from that appearing in Figures 1 and 1A and which, apart from the aircasing construction, differs therefrom principally in that the compressor output passes first through outwardly directed passages 50 to a two-part outlet annulus 51 before being discharged in a generally axial direction into the combustion arrangement; that the contrarotating rotor of the turbine and its associated ducted fan augmenter are omitted; and that the forward end of the shaft 7 is used to drive, through a concentric epicyclic reduction gear, the coaxial shafts of a pair of contrarotating airscrews.

The aircasing in this instance comprises an inner member 17 of frustro-conical form having internal strengthening ribs 53. The said inner member 17 is supported at its forward end by oppositely tapering radially inwardly and outwardly directed frustro-conical elements 54, 55 secured thereto and to the rear wall 11 of the compressor housing, and at its rear end by a somewhat similar arrangement of frustro-conical elements 56, 57 of which the inner one is secured to the housing of the turbine rotor bearing 58 which, as in Figure 1, is arranged forwardly of the rotor for the better access of cooling air, and the outer one is secured to the inner part of the turbine nozzle ring 19. The elements 17, 54, 56, thus completely enclose an inner chamber within the aircasing. The outer member of the aircasing comprises a member 27 of cylindrical-conical form having its largest diameter at its forward end, where it is secured to the compressor outlet annulus 51, and tapering to its rear end, where it is secured to the base rim of a generally frustro-conical element 59, the apex of which is secured to the outer part of the turbine nozzle ring 19. Each of the mentioned parts of the aircasing is fabricated from relatively thin sheet metal to form a tubular or dished annular element of considerable stiffness, so that when they are united a backbone structure is obtained having a high degree of rigidity combined with light weight which, when secured to the compressor and turbine, forms therewith a substantially rigid unit.

Where a sheet metal element is to be joined to another part, it is provided with a thickened flange, as indicated in the drawing, by welding on to the sheet metal a strip of more substantial metal.

As in the embodiment illustrated in Figures 1 and 1A the outer wall 27 of the aircasing is axially removable, although in this case rearwardly, to expose the combustion system, which again comprises a series of flame tubes spaced around the hollow annulus formed by the aircasing. As before, the flame tubes comprise a generally cylindrical body 30 forwardly closed by a conical end engaging the fuel burner or nozzle 31 and supported at the rear end by an outlet chute 32 positioned by a hollow strut 33 passing therethrough. In place of the complete air-jacketing of the aircasing by liners corresponding to those in the previous construction, the compressor discharges through sheet metal outlet nozzles 60 which at their upstream ends are of flattened section to fit a segment of the annular outlet of the compressor, and merge downstream into a cylindrical shape which encloses for a substantial distance the upstream end of one flame tube and is spaced from it to allow the passage of air.

The flame tube arrangement just described again provides for the ready individual removal of the tubes after access thereto has been obtained by displacing the outer wall 27, the method of removal being the same as described in relation to Figures 1, 1A and 2 except that it is also necessary to displace the nozzles 60 rearwardly over the upstream end of the corresponding tube body, the clearances between each nozzle and body being made such that when this has been done both nozzle and body can be tilted outwardly without fouling the burner 31.

A feature of the design illustrated in Figures 4, 4A and 5 is that the entire inner chamber defined by the members 17, 54, 56 is maintained under pressure in order to compensate for the external pressure in the annular aircasing. By this means, the sheet metal inner structure 17, 54, 56, may be made much lighter, and with less attention to inner stiffening, than would otherwise be the case; in fact, the feature is of great importance in enabling the maximum advantage to be taken of the lightness of structure offered by the use of sheet metal. By providing suitable outlets, compressed air within the said inner chamber may be utilised to provide air cooling circuits, such as those indicated by arrows in the drawing, to the compressor and turbine rotors and the shaft bearings. As indicated in the drawing, the internal pressure may be obtained by tapping air under pressure from the aircasing by means of a pipe 61 connected to the inner chamber, the air passing through a cooler 62.

I claim:

A gas turbine power plant comprising a compressor assembly including a compressor rotor and an enclosing compressor stationary structure which includes a wall on the downstream side of the compressor rotor; a turbine assembly including a turbine rotor coaxial with and axially spaced from the compressor rotor and an enclosing turbine stationary structure which includes a wall on the upstream side of the turbine rotor; a driving shaft carrying said rotors; bearings mounted in said walls in the compressor and turbine stationary structures and supporting said shaft; and a combustion system lying between the compressor and turbine assemblies and including an aircasing formed by an inner and an outer tubular axially extending wall coaxially surrounding said shaft, the aircasing forming a path for working fluid from the compressor to the turbine extending generally in an axial direction, and at least one flame tube within the aircasing; said inner wall being a unitary structure and rigidly attached at its ends to said compressor and turbine stationary structures to form the backbone of the plant.

GEOFFREY B. R. FEILDEN.

REFERENCES CITED

The following references are of record in the file of this patent:

UNITED STATES PATENTS

| Number | Name | Date |
|---|---|---|
| 2,401,826 | Halford | June 11, 1946 |
| 2,432,359 | Streid | Dec. 9, 1947 |
| 2,445,114 | Halford | July 13, 1948 |
| 2,468,461 | Price | Apr. 26, 1949 |
| 2,469,439 | Lundquist | May 10, 1949 |
| 2,479,573 | Howard | Aug. 23, 1949 |